(12) United States Patent
Deister

(10) Patent No.: US 9,690,975 B2
(45) Date of Patent: Jun. 27, 2017

(54) QUANTITATIVE STRUCTURAL ASSAY OF A NERVE GRAFT

(71) Applicant: AxoGen, Inc., Alachua, FL (US)

(72) Inventor: Curt Deister, Alachua, FL (US)

(73) Assignee: AXOGEN CORPORATION, Alachua, FL (US)

( * ) Notice: Subject to any disclaimer, the term of this patent is extended or adjusted under 35 U.S.C. 154(b) by 50 days.

(21) Appl. No.: 14/724,359

(22) Filed: May 28, 2015

(65) Prior Publication Data
US 2016/0350918 A1    Dec. 1, 2016

(51) Int. Cl.
*G06K 9/00* (2006.01)
*G06T 7/62* (2017.01)
*G06T 7/00* (2017.01)

(52) U.S. Cl.
CPC ....... *G06K 9/00147* (2013.01); *G06K 9/0014* (2013.01); *G06T 7/0012* (2013.01); *G06T 7/62* (2017.01); *G06T 2207/10056* (2013.01); *G06T 2207/30024* (2013.01)

(58) Field of Classification Search
CPC ......... A61B 17/1128; A61B 2017/1139; A61L 2300/258; A61L 2430/32; A61L 27/24; A61L 27/54; G06T 7/0014; G06T 7/602; G06T 7/0081; G06T 7/0095; G06T 2207/20148; G06T 2207/20048; G06T 2007/20021; G06T 2207/30024; G06K 9/0014
See application file for complete search history.

(56) References Cited

U.S. PATENT DOCUMENTS

2013/0108645 A1*  5/2013  Farah .................. C12N 9/6478
                                                                  424/158.1

OTHER PUBLICATIONS

More, Heather L. et al., "A semi-automated method for identifying and measuring myelinated nerve fibers in scanning electron microscope images," *Journal of Neuroscience Methods*, 2011, 201:149-158.

* cited by examiner

*Primary Examiner* — Tom Y Lu
(74) *Attorney, Agent, or Firm* — Saliwanchik, Lloyd & Eisenschenk

(57) ABSTRACT

Techniques are described for determining the quality of a nerve graft by assessing quantitative structural characteristics of the nerve graft. Aspects of the techniques include obtaining an image identifying laminin-containing tissue in the nerve graft; creating a transformed image using a transformation function of an image processing application on the image; using an analysis function of the image processing application, analyzing the transformed image to identify one or more structures in accordance with one or more recognition criteria; and determining one or more structural characteristics of the nerve graft derived from a measurement of the one or more structures.

22 Claims, 6 Drawing Sheets
(5 of 6 Drawing Sheet(s) Filed in Color)

QUANTITATIVE STRUCTURAL ASSAY OF A NERVE GRAFT

BACKGROUND

Peripheral nerves are often damaged or severed when a person suffers a traumatic injury. Direct nerve repair can be used for small gaps, but larger gaps are sometimes repaired using nerve grafts. While the axonal segment proximal to the site of the injury can regenerate new axonal sprouts, non-functional distal axon segments and their myelin sheaths are believed to have growth-inhibitory effects that curtail nerve regeneration. Substantial evidence indicates that the clearance of non-functional nerve elements improves axonal growth in the distal nerve segment.

One technique for improving the effectiveness of nerve grafts includes clearing the nerve graft of nonfunctional nerve elements before surgically installing the graft into the repair site. Nerve grafts, for example, acellular grafts, having a structure and composition similar to a nerve fascicle, can assist in axonal regeneration by providing a scaffold through which new axon segments can grow. An acellular nerve graft, sometimes called a processed nerve graft, supports and directs the growing axon segments with supporting structures, while providing a pathway clear of axonal and myelin debris.

BRIEF SUMMARY

The subject invention provides materials and methods for determining the quality of a nerve graft by assessing quantitative structural characteristics of the nerve graft. In certain embodiments, the methods involve obtaining an image identifying laminin-containing tissue in the nerve graft; creating a transformed image using a transformation function of an image processing application on the image; using an analysis function of the image processing application, analyzing the transformed image to identify one or more structures in accordance with one or more recognition criteria; and determining one or more structural characteristics of the nerve graft derived from a measurement of the one or more structures.

In some embodiments, the structural characteristics are derived from measurements of the endoneurial tubes present in the fascicles of the nerve graft. In certain embodiments, structural characteristics include: the number of endoneurial tubes per area, the percent of endoneurial tube lumen per area, the total perimeter of endoneurial tube lumens per area, or any combination thereof.

In some embodiments, the techniques may further comprise comparing the structural characteristics to a qualitative assessment score; one or more reference ranges indicating an acceptable structural characteristic of the nerve graft; a bioassay result of the nerve graft; or any combination thereof.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The patent or application file contains at least one drawing executed in color. Copies of this patent or patent application publication with color drawings will be provided by the Patent Office upon request and payment of the necessary fee.

DETAILED DESCRIPTION

The degree to which a nerve graft is effective in promoting axon growth is believed to be related to the structural characteristics of the nerve graft; however, effective reproducible mechanisms of assessing the structural characteristics of a nerve graft have been lacking. The subject invention provides techniques are described for determining the quality of a nerve graft by assessing quantitative structural characteristics of the nerve graft.

In some embodiments, the structural characteristics are derived from measurements of the endoneurial tubes present in the fascicles of the nerve graft.

The outermost layer of the nerve cable is the epineurium, which is the layer most often interacted with in peripheral nerve repair. In larger nerve cables, the cable is subdivided into multiple fascicles, which are defined by another connective tissue layer, the perineurium. "Endoneurial tubes" are the smallest, thinnest and innermost connective tissue layer in peripheral nerve cables and may also be called the endoneurium, endoneurial channel, endoneurial sheath, or Henle's sheath. They are secreted by and around Schwann cells, which are ensheathing axons. The course of the endoneurial tubes is generally longitudinal along the course of the nerve cable except where fibers leave (or enter, in the case of communication branches between different nerve cables) the nerve cable. The endoneurial tube is a thin basement membrane principally consisting of a layer of Collagen IV with a layer of laminin on the interior surface.

Figure 1:
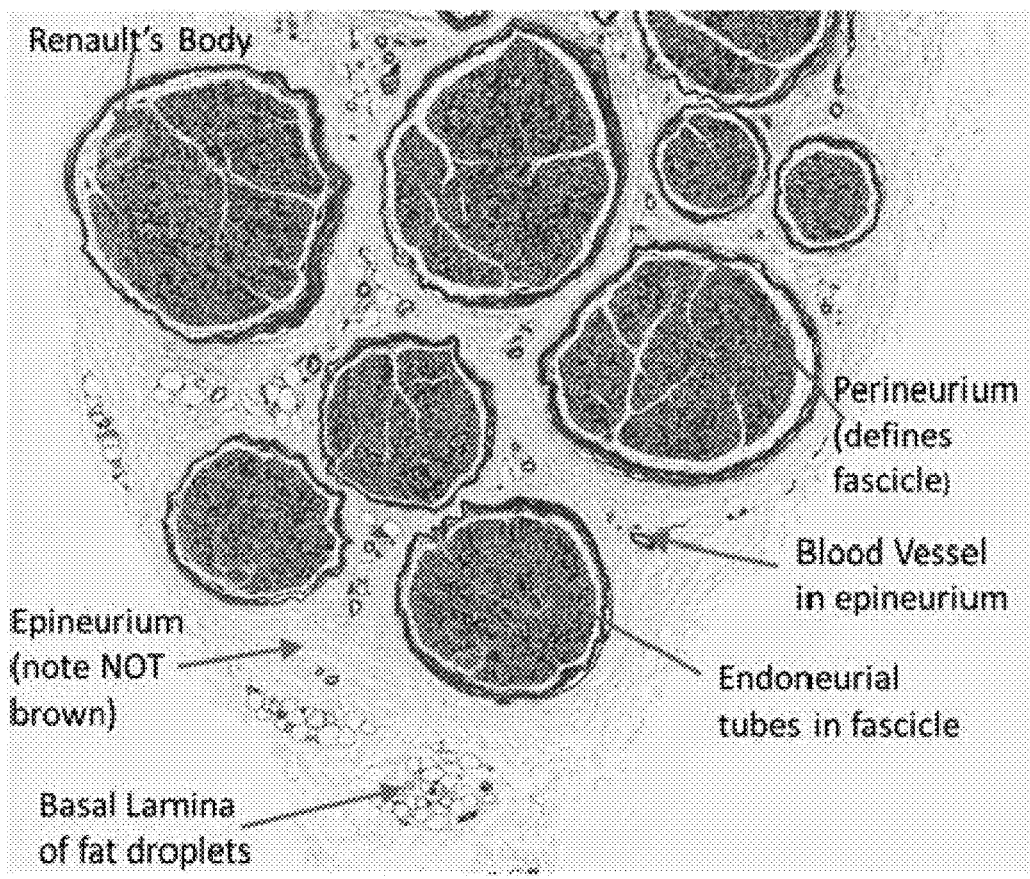
FIG. 1 shows an image of a slide having a cross-section of a peripheral nerve fiber with anti-laminin staining to highlight the endoneurial tubes and other nearby structures.

FIG. 1 shows an image of a slide having a cross-section of a peripheral nerve fiber with anti-laminin immunostaining highlighting the endoneurial tubes.

Important aspects of the potency or bioactivity of a nerve graft are the graft's structural integrity and structural characteristics. The greater the quantity and accessibility of the bioactive scaffold (laminin-coated endoneurial tube geometry) present in the graft, the greater the bioactivity of the graft. The reason is that more bioactive scaffold provides more growth structures for axons and Schwann cells to extend onto.

Immunohistochemical staining (e.g., anti-laminin staining) can verify the presence of laminin in the endoneurium. In embodiments of the techniques of the subject invention, tissue from the processed nerve graft is stained using an anti-laminin antibody. The antibody may be, for example, a polyclonal antibody. Scanned images of the tissue undergo image processing to determine the structural characteristics of laminin-stained structures, such as endoneurial tubes, present in the two dimensional histology section.

Image processing in some embodiments can include selection of sub-structures or regions of interest (e.g., fascicles) to further refine those areas of the image where relevant structures are to be found. Selection can be manually performed by a human operator, for example, by using a selection tool to outline the outer border of the structure or region. Selection can also be automated by the image processing application and in some cases verified by a human. In some embodiments, a "sampling window" can be used to define a subset of the image. In some embodiments, the whole image may be utilized.

In some embodiments, image processing includes manipulating the image to make structures of interest more visible for analysis. Types of image processing used in some embodiments include thresholding the image in accordance with various parameters.

In some embodiments, the identification of structures (e.g., endoneurial tubes) used to determine structural characteristics are in accordance with one or more recognition criteria, such as the size and circularity of the structures.

In various embodiments, the structural characteristics can include measurements of (1) the number of endoneurial tubes in an area, (2) the percent of endoneurial lumen in an area, and/or (3) the total perimeter of endoneurial tube lumens in an area. Better structural characteristics result in higher determined values. These methods provide quantitative evidence of laminin presence and configuration in the endoneurium of the nerve grafts. Structural characteristics may be calculated over areas comprised of selected regions of interest and/or substructures, over a sampling window, or over fixed areas.

In some embodiments, quantitative assessments of structural quality may be correlated to qualitative assessments. The quantitative metrics can be correlated to other metrics such as historically obtained qualitative scores from the same grafts. One method of qualitatively assessing the structural integrity of a processed nerve allograft includes anti-laminin staining of the tissue and scoring the visual appearance on a qualitative ranking scale (e.g., a 1 to 5 scale divided into 0.5 increments) in comparison to a positive control containing unprocessed peripheral nerve tissue. However, these methods are operator-dependent and are unable to precisely assess the quantity and availability of bioactive scaffold using a reproducible methodology.

In some embodiments, the determined structural characteristics for a given sample can be compared to a reference range for those structural characteristics that indicate acceptable nerve graft quality. A nerve graft having values for structural characteristics that fall outside the range may be deemed to be of unacceptable quality.

In some embodiments, determined structural characteristics may be compared or correlated with results from a bioassay of the nerve graft. A bioassay may, for example, determine the bioactivity of a graft by measuring the extent of neurite growth in a cultured graft. In some cases, results from a bioassay may be correlated with the results from the structural characteristics to derive reference ranges for acceptable quality grafts.

Figure 2:
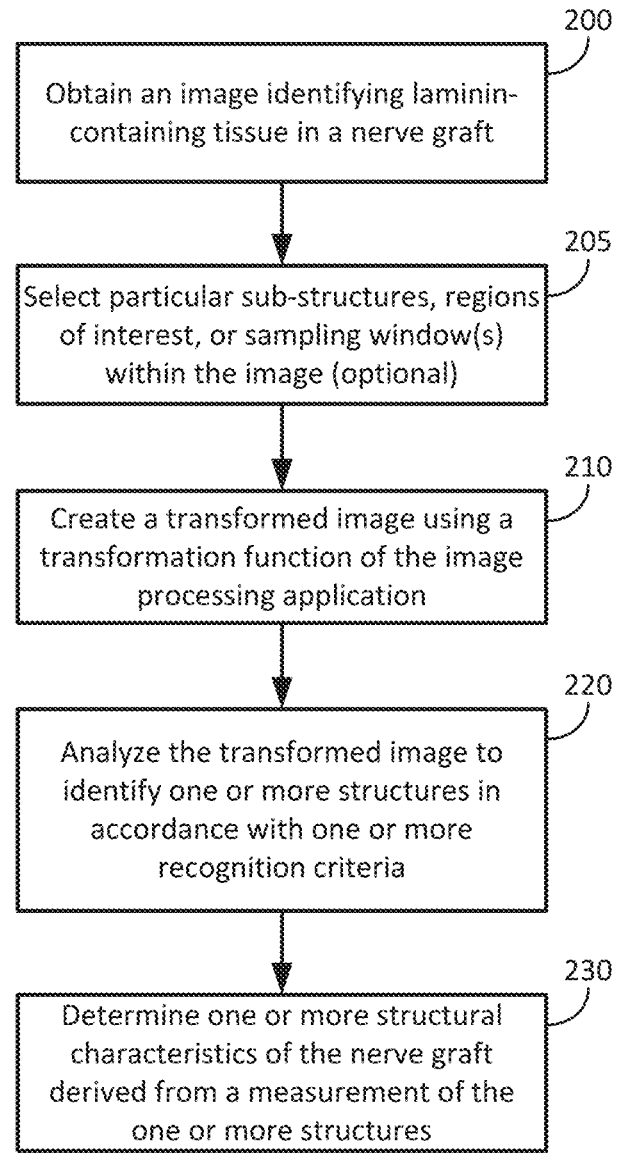
FIG. 2 shows an example procedural flow that may be used in some embodiments of the techniques.

FIG. 2 shows an example procedural flow that may be used in some embodiments of the techniques.

Some procedures may be performed using functions or features of an image processing application, which is a computer program for manipulating the characteristics of digital images. An example of an image processing application that may be used in examples herein is Fiji (also known as ImageJ). Furthermore, some procedures described in FIG. 2 may be optional in some embodiments.

An image identifying laminin-containing tissue in a nerve graft is obtained (200). Generally, these nerve graft cross-sections (or, "sections") are obtained by histological preparation of a sample of a nerve graft, e.g., sectioning, fixing, staining, and mounting a sample on a slide, which is then imaged using slide scanning hardware and software. Such images can be a by-product or outcome of, for example, a production, processing, or quality control stage of readying the graft for surgical implantation. In some cases, the images may have been derived during one phase of production/processing, stored, and then may be assessed using the described techniques at a different time.

In some embodiments, the nerve graft is a processed nerve allograft (human) intended for the surgical repair of peripheral nerve discontinuities to support regeneration across the defect. An example of a processed nerve allograft is the Avance® Nerve Graft from AxoGen. Nerve allografts provide surgeons with a readily available nerve graft to repair peripheral nerves damaged by, for example, traumatic injury or removed during a surgical procedure. A processed human nerve allograft is decellularized and processed, resulting in a surgical implant with the natural structural pathways to guide axon regeneration. Such nerve grafts are available in a range of lengths and diameters, and work similarly to an autograft nerve without the comorbidities associated with secondary surgical site. Processing and decellularization of the nerve allograft clears much of the axonal and myelin debris so that nerves may have an unimpeded pathway in which to regrow. Processing also removes material and molecules that may potentially elicit a deleterious immune response in the recipient.

In some embodiments, the sections of nerve graft undergo immunohistochemical staining to identify relevant structures in the image. For example, anti-laminin staining of a section of a nerve graft can result in high-contrast images showing the endoneurial tubes and other laminin-containing structures. In some cases, for example, staining can be performed with an immunoperoxidase stain using a polyclonal rabbit anti-laminin (Dako Z0097) with a polymer-based secondary system (Dako Envision and Rabbit HRP) and DAB (3,3'-diaminobenzidine) as the developing agent. However, other kinds of staining (such as a monoclonal antibody stain) or other structural demarcation techniques that identify an endoneurial tube or other key structural components sufficiently in an image can be used.

Referring again to FIG. 1, anti-laminin staining of a nerve graft cross section is depicted. In this Figure, laminin-containing structures are shown in brown. Laminin-containing structures that are important to determining structural characteristics include the endoneurial tubes and perineurium (which defines the fascicle).

In some cases, the quality of staining is reviewed for its adequacy as a foundation for analysis of structural characteristics of the graft. Such a review may be conducted by a human operator or quality control personnel. Characteristics of quality anti-laminin staining include: the section is largely free of artifacts and/or technical problems such as lifting; the staining color is brown (not blue, black, or other colors); the staining is localized to extracellular matrix structures expected to contain laminin (endoneurial tubes and perineurial layers principally, but also the basal lamina surrounding fat droplets); and staining is not present or is minimal in the interior (lumens) of the endoneurial tubes and in the epineurium.

In some embodiments, techniques include selecting particular sub-structures, regions of interest, or sampling window(s) within the image before further transformation and assessment of the structures (205). For instance, in some cases, particular substructures (e.g., the nerve fascicles) are selected to normalize the data to the area that would be expected to have the structural characteristics of interest. Selecting sub-structures or regions of interest in this way can also allow structural characteristics to be expressed in terms such as "per fascicle," or as a ratio of fascicle area. In some cases, selection of substructures can eliminate areas that may skew structural characteristics or measurements therefrom (e.g., fat droplets are usually outside a fascicle).

Selection of regions of interest or substructures (e.g., fascicles) can be performed manually or can be automated. In manual selection of fascicles, for instance, a human operator might trace the outline of fascicles using a region of interest selection tool in the image processing application (for example, to select a region of interest in Fiji/ImageJ, the "freehand selection tool" can be used to delineate an area of interest which is then added to the region of interest list using the manager tool). An automated selection of fascicles can use an automated feature identification function, for example, to identify structures having certain anti-laminin staining characteristics such as a brown color or a thickness indicating the perineurium. Automated selection tasks may also be reviewed in a quality control step by a human operator and may be called "computer-assisted selection."

In some cases, a sampling window can be used to select a subset of the image. For example, a predetermined square area of the image (e.g., a 100,000 pixel area in the center of the image) might be used. Use of a fixed size sampling window can obviate the need for manual or automated substructure selection steps, allowing the structural characteristics to be determined in relation to a fixed area.

Whether an arbitrary selection of areas of interest in the image, a sampling window, or the entire image is used, creating a transformed image using a transformation function of the image processing application (210) can assist in the identification of relevant structures. In some embodiments, transformation may include "thresholding," in which an image is converted to binary and image pixels meeting threshold conditions are selected.

Figure 3A:
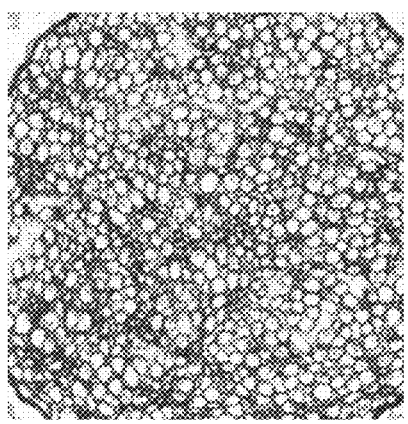
FIG. 3A shows the effect of thresholding on an image of a laminin-stained endoneurial tube cross section.
Figure 3A:
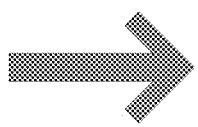
Figure 3A:
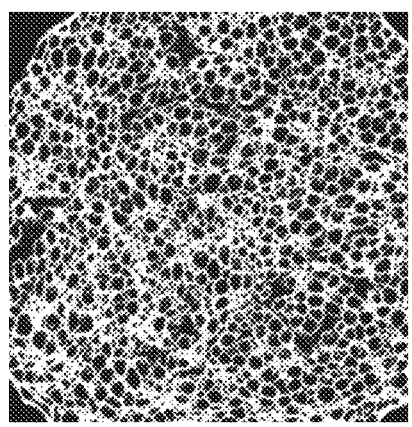

FIG. 3A shows the effect of thresholding on an image of a laminin-stained endoneurial tube cross section. In FIG. 3A, a laminin-stained area 300 of an image is shown. Thresholding the image 300 produces a binary (e.g., black and white) image 310.

Thresholding the image 300 in FIG. 3A may be performed in image processing applications such as Fiji/ImageJ. Various settings may be applied to perform the thresholding, such as a threshold method, threshold color, color space, and background. The threshold operation which results in image 310 uses the "default" threshold method, "black & white" threshold color, "HSB" color space, and modifies the background color from white to black.

Thresholding may not need to be adjusted from the default settings in many cases. Sometimes, however, additional adjustments (e.g., a manual adjustment of a "brightness" control by the human operator) may be performed to obtain quality thresholding. Some characteristics of quality thresholding include: primarily the areas staining dark brown (e.g., the endoneurial tubes) are thresholded; and areas with light staining or with Hematoxylin counterstaining have only occasional pixels thresholded.

In some embodiments, the image may be converted to a different representation such as an 8-bit image. In some cases, transformation of the image may include converting the image to a different file format, such as the TIFF format. Naturally, such transformations are dependent on the image processing application chosen in a given embodiment and are intended to be exemplary rather than limiting.

Using the image processing application, the transformed image is analyzed to identify one or more structure in accordance with one or more recognition criteria (220). Structures (and measurements of structures) that may be of interest in determining structural characteristics include, for example, the endoneurial tubes, the lumens of endoneurial tubes (i.e., the enclosed area of space inside space formed by the outer tubular structure of the endoneurium), the perimeter of the endoneurial tube or its lumen, and the area of the endoneurial tube lumen.

In some embodiments, the analysis of the transformed image can include the use of, for example, a "particle analysis" feature of an image processing application (particle analysis is the term used in Fiji/ImageJ, but it should be appreciated by practitioners in the art that different image processing applications can have equivalent features and functions with different names). A particle analysis feature can be used to identify structures having certain characteristics and to derive measurements from those identified structures.

A recognition criterion is a requirement that a condition or property of the structure be satisfied in order for the structure to be recognized as an entity of interest for identification. For example, when using a "particle analysis" function to identify structures, the recognition criterion might require the structure to have certain characteristics to be recognized as a particle. These recognition criteria can be introduced by using features of the image processing application to set constraints on the identification function or to eliminate non-conforming structures from the analysis.

Endoneurial tubes are roughly circular by nature (i.e., they conform to the ensheathing Schwann cells), but due to the biological nature of the source material and the fact that the observations are being made after histological preparation and sectioning, the endoneurial tubes may not be completely circular as observed on the slide. Instead, the tubes may appear flattened or elongated in cross-section.

In some embodiments, a recognition criterion can include a requirement for a "circularity" of the structure. Circularity is a measure of the similarity of the geometry of a structure to that of a circle (mathematically, circularity can be defined as $4*\pi*(area/perimeter^2)$). In principle, the circularity of a structure ranges from 0 to 1. In preferred embodiments, a recognition condition for circularity ranges from 0.5 to 1.0.

A recognition criterion for "size" can be used to filter out structures that are not of interest because they are larger or smaller than the structures being identified. In embodiments where endoneurial tubes are the structures being identified, setting a size criterion can eliminate non-endoneurial structures that also have laminin. For example, the basal laminae of fat droplets and the perineurium of the fascicles themselves may in some cases be filtered out of the analysis due to their size. In preferred embodiments, the size criterion for the structures may range from about 4.8 microns to about 16 microns in diameter. Example 1, below, outlines a procedure by which different recognition criteria may be tested for their usefulness in identifying structures.

Figure 3B:
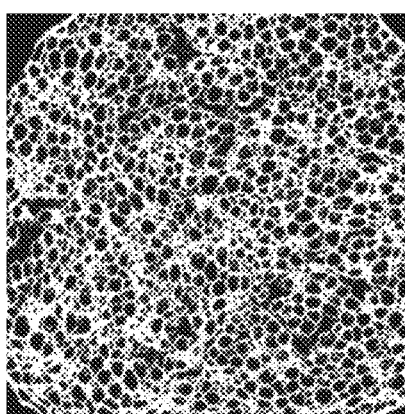
FIG. 3B shows an example of the effect of particle analysis on a thresholded image of a laminin-stained endoneurial tube cross section.
Figure 3B:
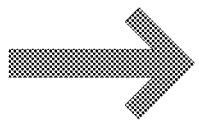
Figure 3B:
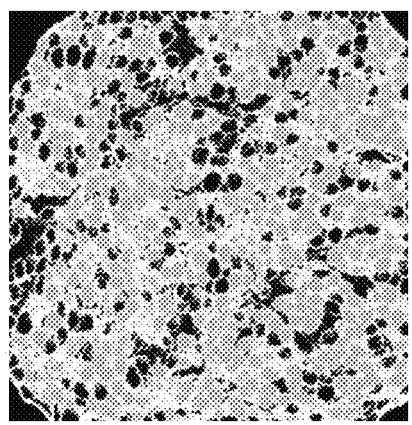

FIG. 3B shows an example, in Fiji, of the effect of particle analysis on a thresholded image of a laminin-stained endoneurial tube cross section. In FIG. 3B, a thresholded image 350 is shown. Particle analysis on the image 350 produces an image 360 where relevant structures have been identified (in the image, the relevant structures are colored in cyan, as the background is black).

Returning to FIG. 2, one or more structural characteristics of the nerve graft derived from a measurement of the one or more structures is determined (230). Once structures of interest have been identified, measurements can be performed on the identified structures (e.g., their area, perimeter, number, etc., as noted above) and calculations can be made from the measurements to determine the structural characteristics of the nerve graft.

Generally, the structural characteristics of relevance are those that indicate the amount and accessibility of bioactive scaffold in the graft. These structural characteristics may be derived from measurement and computation of the structures that were identified from the transformed image. For instance, the structural characteristics can include measurements of (1) the number of endoneurial tubes per area, (2) the percent of endoneurial lumen per area, and/or (3) the total perimeter of endoneurial tube lumens per area.

Some structural characteristics may be determined in reference to an area. An area may contain a fixed number of absolute or relative units. Such an area may be measured, for example, in relative units (such as an area of pixels, or $pixel^2$ for clarity in cases where a length in pixels is also used, which might have a varying true size depending on characteristics of the image scanner, image format, or display technology) or in absolute units, like $microns^2$. For instance, a sampling window of a fixed number of units (e.g., 10,000 $pixel^2$) might be taken from an image and the structural characteristics determined in reference to the sampling window. In another aspect, the area can denote one or more regions of interest within a larger area, like a preselected set of fascicles having certain sizes or visual characteristics. If fascicles were preselected (either manually or computer-assisted) in step 205, the area used to compute structural characteristics might be, for example, per each fascicle or per total area of fascicles in a sample.

One example of a structural characteristic, the number of endoneurial tubes per area, can be calculated by counting the number of tubes and dividing by the area. As noted, this characteristic can be calculated with the area being, e.g., an area of a fixed number of units of absolute or relative size, per-fascicle, and/or a total fascicle area.

Another example of a structural characteristic, the percent of endoneurial lumen per area, can be calculated by obtaining the area of each of the identified structures (i.e., endoneurial tube lumens), summing the lumen areas, and dividing by the area. As noted, this characteristic can be calculated with the area being, e.g., an area of a fixed number of units of absolute or relative size, the area of a fascicle, and/or a total fascicle area for a sample.

Another example of a structural characteristic, the total perimeter of endoneurial tube lumens per area, can be calculated by obtaining the perimeter of each of the identified structures (i.e., endoneurial tube lumens), summing the perimeters, and dividing by the area. As the identified structures (e.g., the particles) are the lumens of the endoneurial tubes, a measurement of their perimeter corresponds to measurement of the perimeter of the laminin-containing inner surface of the endoneurial tube. As noted, this characteristic can be calculated with the area being, for example, an area of a fixed number of units of absolute or relative size, the area of a fascicle, and/or a total fascicle area for a sample.

In some embodiments, the structural characteristics are weighted by fascicle size. Weighting, in reference to handling the determination of a test statistic from multiple fascicles of different sizes, refers to increasing the importance of larger fascicles for the determination of the test statistic for the entire section to account for their larger size (i.e. the test statistic of the section is the average of the test statistic multiplied by the relative fascicle area for weighted vs. the average of the test statistic only for unweighted). Weighting a per fascicle result average in this manner may be equivalent to converting a per fascicle result average into a per total fascicle area average.

Figure 4:
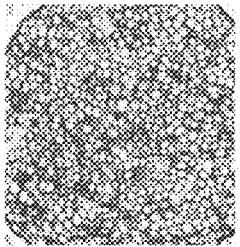
FIG. 4 shows an example embodiment comparing images of a nerve graft as various described techniques are performed.

FIG. 4 shows an example embodiment comparing images of a nerve graft as various described techniques are performed. The nerve graft in this example is an Avance® nerve graft from AxoGen, Inc. In FIG. 4, one column of images shows "acceptable structure" and a second column shows "unacceptable structure." The column labeled acceptable structure shows the original staining, thresholded, and analyzed images from a nerve graft that originally passed a qualitative assessment by a human operator. The column labeled unacceptable structure shows the original staining, thresholded, and analyzed images for a nerve graft that did not pass a qualitative assessment. A view of each original stained image and the images resulting from the transformation and particle analysis steps are shown. After analysis, a determination of structural characteristics showed that the acceptable graft had endoneurial tube lumens comprising 30.4% of the fascicle area and that the unacceptable graft had endoneurial tube lumens comprising only 6.7% of the fascicle area.

EXPERIMENTS AND EXAMPLES

Following are examples illustrating procedures for practicing the techniques disclosed herein. Advantages of the techniques may be illustrated from results obtained from one or more of these examples. Examples may also depict experimental conditions to refine the characteristics of certain method parameters. These examples and experiments should not be construed as limiting.

Example 1

An embodiment of the invention was constructed to experimentally derive certain ranges and parameters. As noted in the described method flow, images of samples containing a cross-section of a nerve graft were obtained. Experimental conditions included alternative options for several parameters, which were then compared for closeness of fit to a qualitative histology score determined from the same sample images.

The laminin histology images of eleven (11) nerve graft lots comprising Avance® nerve grafts from AxoGen, Inc. were assessed. The lots included 33 large diameter (3-5 mm) and 33 small diameter (1-3 mm) samples. Images were derived from slides scanned into ImageScope from Aperio. In this case, the images were examined by an operator for the quality of the anti-laminin staining.

In this example embodiment, the fascicles were selected using an image processing application. Here, the image processing application is Fiji (also known as ImageJ). The fascicles were selected using two methods that are evaluated as parameters: manual selection using a freehand selection tool in Fiji, and computer-assisted selection using a Fiji macro followed by a quality review and correction by a human operator. Results of the two techniques are compared below.

In this example, transformation of the image using the image processing application (here, Fiji) includes applying thresholding settings to the image. Thresholding may enhance or reduce certain characteristics of the image so that the image processing application can better analyze the structures (e.g., the endoneurial tubes) depicted in the image. Initial thresholding settings include using the image processing application's "default" method; setting the threshold color to "black and white"; setting the color space to "HSB"; and setting the background to dark. The brightness of the transformed image may also be adjusted. Here, transformation of the image also includes converting the image to an 8-bit representation.

Structures (e.g., the endoneurial tubes in the fascicles) were identified in this example using the "particle analysis" capability of the image processing application (here, Fiji). The particle analysis feature identifies structures by virtue of its ability to recognize discrete objects in the image because those objects were highlighted by immunohistochemical staining and, in some cases, because image transformation settings make the staining more discernible to the image processing application. Furthermore, when substructures, regions of interest, or sampling windows are selected, the analysis may be carried out only within those regions.

In the example, settings for particle analysis function included recognition criteria for size and circularity and settings to "include holes" and "exclude on edges." Measurement settings include "area," "perimeter," and "integrated density."

Example 1 utilizes two recognition criteria for determining a structure: size and circularity. A total of 32 different combinations of size and circularity are shown in Table 1 below. The size indicates an area, in pixels, of the structure. In this case, an image pixel equals 0.495 microns in accordance with the Aperio slide scanner settings.

TABLE 1

Criteria for Endoneurial tube recognition

| Criteria set | Size (pixels^2) | Circularity |
|---|---|---|
| 1 | 20-820 | 0.3-1.0 |
| 2 | 75-820 | 0.3-1.0 |
| 3 | 20-1050 | 0.3-1.0 |
| 4 | 75-1050 | 0.3-1.0 |
| 5 | 20-1300 | 0.3-1.0 |
| 6 | 75-1300 | 0.3-1.0 |
| 7 | 20-2000 | 0.3-1.0 |
| 8 | 75-2000 | 0.3-1.0 |
| 9 | 20-820 | 0.4-1.0 |
| 10 | 75-820 | 0.4-1.0 |
| 11 | 20-1050 | 0.4-1.0 |
| 12 | 75-1050 | 0.4-1.0 |
| 13 | 20-1300 | 0.4-1.0 |
| 14 | 75-1300 | 0.4-1.0 |
| 15 | 20-2000 | 0.4-1.0 |
| 16 | 75-2000 | 0.4-1.0 |
| 17 | 20-820 | 0.5-1.0 |
| 18 | 75-820 | 0.5-1.0 |
| 19 | 20-1050 | 0.5-1.0 |
| 20 | 75-1050 | 0.5-1.0 |
| 21 | 20-1300 | 0.5-1.0 |
| 22 | 75-1300 | 0.5-1.0 |
| 23 | 20-2000 | 0.5-1.0 |
| 24 | 75-2000 | 0.5-1.0 |
| 25 | 20-820 | 0.6-1.0 |
| 26 | 75-820 | 0.6-1.0 |
| 27 | 20-1050 | 0.6-1.0 |
| 28 | 75-1050 | 0.6-1.0 |
| 29 | 20-1300 | 0.6-1.0 |
| 30 | 75-1300 | 0.6-1.0 |
| 31 | 20-2000 | 0.6-1.0 |
| 32 | 75-2000 | 0.6-1.0 |

In Example 1, three structural characteristics were determined from the recognized endoneurial tubes: the number of endoneurial tubes in a 100,000 pixel area, the percent of endoneurial tube lumen in an area, and the total perimeter of endoneurial tube lumens in a 100,000 pixel area.

In this example, weighting was applied as an experimental parameter. As noted, weighting may convert a per fascicle test statistic into a per total fascicle area test statistic.

As an objective of Example 1 was to assess varying parameters of the techniques, effects of the varied parameters are discussed. Outcomes of alternative parameter choices were evaluated by comparing the values of their "goodness of fit" with historical qualitative histology scores (e.g., $R^2$ values). In this example, the qualitative histology score is a rating by a human evaluator on a 1 to 5 scale divided into 0.5 increments that compares the appearance of laminin in a test sample of nerve graft tissue against a positive control containing unprocessed peripheral nerve tissue. A higher score indicates a closer fit, i.e., the appearance of more bioactive scaffold.

"$R^2$" (or R^2) is the Coefficient of Determination, a measure of the "goodness of fit" of an experimental vs. theoretical/modeled data set. Mathematically, $R^2 = 1 - [sum((yi-fi)^2)/sum((yi-avgy)^2)]$ where "y" is the experimental data, "f" is the modeled data, "i" is the counter for the dataset (i.e. "i" goes from 1 to the number of datapoints), and "avgy" is the average of "y" over the full data set.

Little effect of weighting for fascicle/selection area was noted. However, weighting the results, as described, by total fascicle/selection area did result in slightly better correlation to the historical histological scoring.

Assisted area selection was equivalent to the completely manual method as evidenced by the similarity of $R^2$ values. The assisted area selection method has the analyst review every selection and correct it if necessary. Though the assisted method tended not to include some of the smallest fascicles, it is mostly equivalent to the completely manual method. This would be expected from the great similarity of the areas selected by both methods ($R^2 = 0.995$ comparing total area per section).

The data collected on the number of endoneurial tubes indicates that using a lower particle limit of 20 pixels leads to selecting features that are not associated with historical histological scoring (i.e. lowers the correlation). Thus, a preferred lower limit for the "size" recognition criterion is 75 pixels (~5 micron diameter).

The data collected on % area (and perimeter) show that use of an upper particle limit of 1,300 and above leads to selecting features that are not associated with historical histological scoring (i.e. lowers the correlation). Thus, a preferred upper limit for the "size" recognition criterion is below 1,300 pixels (e.g., 820 or 1050 pixels; ~16 or ~18 microns in diameter).

The circularities were roughly similar for # of tubes and % area, but the 0.3-1.0 and 0.4-1.0 circularity ranges were less stable. Thus, a preferred circularity range is 0.5-1.0.

All three structural characteristics in this example (# of tubes, % area, and perimeter of tubes) gave broadly similar results, with some differences depending on the particle analysis method.

Example 2

An embodiment of the invention was developed to experimentally assess the closeness of fit of certain described techniques to the qualitative historical histology score determined from the same sample images. To summarize, Example 2 used specific ranges for the size and circularity recognition conditions, and assisted selection, and compared three structural characteristics against a historical qualitative score for goodness of fit.

As noted in the described method flow, an image of a sample containing a cross-section of a nerve graft was obtained. In Example 2, thirty-two lots of Avance® Nerve Graft from AxoGen, Inc. were assessed; the lots included four lots that did not pass the qualitative historical histology structural acceptance criteria. Result analysis examined the correlation between historical scoring data and three quantifiable structural characteristics. The data was assessed by comparing the historical score for a given sample (e.g., from a single graft, also known as a "section") to each of the three structural characteristics. In addition, the data was assessed by comparing the historical score average for a lot (average of scores for 6 samples with each sample from a separate graft) versus the three structural characteristics for the same lot. In summary, the results found that, for individual samples, comparison to the perimeter of endoneurial tubes provided the best fit ($R^2$=0.622) and for the lot average, the percent endoneurial lumen area provided the best fit ($R^2$=0.581).

In this embodiment of the described techniques, the following parameters and conditions were used: The areas of all fascicles in a section were outlined in Fiji using an initial computer selection followed by a manual inspection and correction, when necessary (i.e., computer-assisted).

Transformation of the image using Fiji included applying thresholding settings to the image. Initial thresholding settings include using the image processing application's "default" method; setting the threshold color to "black and white"; setting the color space to "HSB"; and setting the background to dark. The brightness of the transformed image may also be adjusted. Transformation of the image also includes converting the image to an 8-bit representation.

Endoneurial tubes in the fascicles were identified using the "particle analysis" capability of Fiji. Recognition criteria for performing the particle analysis included size ranges and circularity ranges. The size criterion was set to identify structures from 75 to 820 pixel in area. The circularity criterion was set to identify structures having a 0.5-1.0 circularity range. In this example, settings for particle analysis function included settings to "include holes" and "exclude on edges." Measurement settings include "area," "perimeter," and "integrated density."

Three structural characteristics were determined from the recognized endoneurial tubes: the number of endoneurial tubes in a 100,000 pixel area, the percent of endoneurial tube lumen in an area, and the total perimeter of endoneurial tube lumens in a 100,000 pixel area.

Note that a 100,000 pixel area is equal to 24,502.5 square microns (or ~0.025 square millimeters). The units of the test statistic are linear pixels (i.e. length of pixels) with one pixel being 0.495 microns in length for Aperio ImageScope.

Weighting based on the size of the fascicle was applied in the calculation of structural characteristics.

As noted, experimental data was assessed by comparing the historical score for a given sample or set of samples to each of the three structural characteristics for the sample/set. The mathematical "goodness of fit" (or $R^2$) between the experimental and modeled data set was calculated as part of the assessment. Results are described below and in the FIGS. 5A-5C.

Figure 5A:
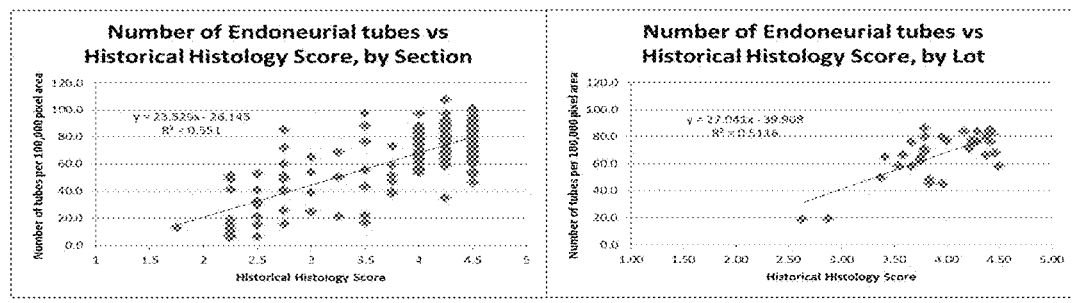
FIGS. 5A-5C show scatter plots comparing various structural characteristics to the historical qualitative histology score.

FIG. 5A shows scatter plots comparing the number of endoneurial tubes structural characteristic to the historical histology score for all sections (individual samples) and all lots examined, respectively. The $R^2$ value for the section data set is 0.551, and the $R^2$ value for the lot data set is 0.5118.

Figure 5B:
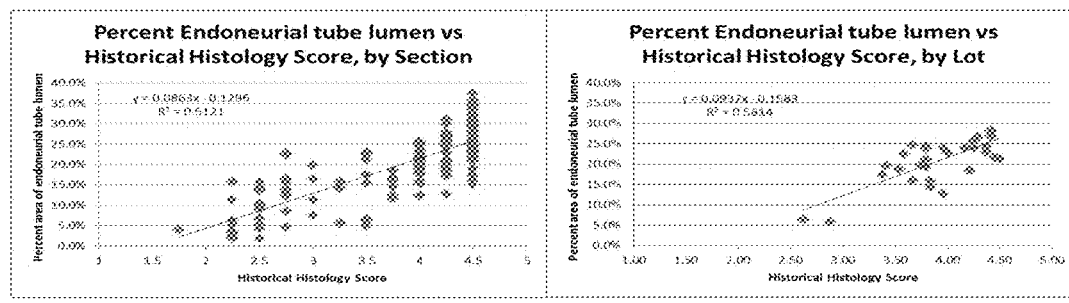

FIG. 5B shows scatter plots comparing the percent endoneurial tube lumen structural characteristic to the historical histology score for all sections (individual samples) and all lots examined, respectively. The $R^2$ value for the section data set is 0.6121, and the $R^2$ value for the lot data set is 0.5814.

Figure 5C:
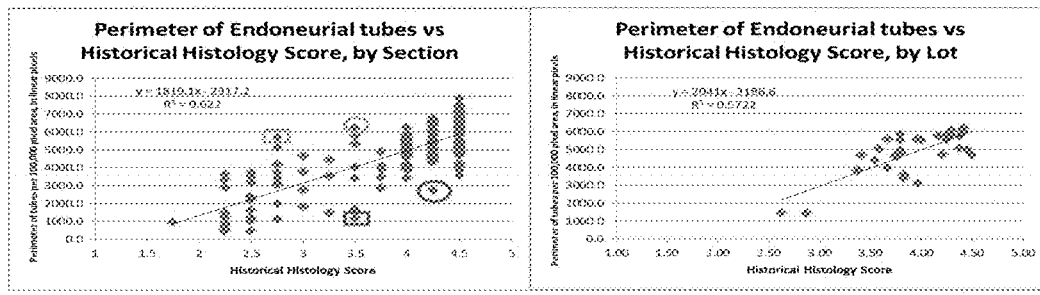

FIG. 5C shows scatter plots comparing the perimeter of endoneurial tubes structural characteristic to the historical histology score for all sections (individual samples) and all lots examined, respectively. The $R^2$ value for the section data set is 0.622, and the $R^2$ value for the lot data set is 0.5722.

Table 2 shows the Pearson Correlation Coefficients for historical histology scores in comparison to the structural characteristics for the samples. Note: these are correlation coefficients ("R") not coefficients of determination ("$R^2$") as shown in the plots.

TABLE 2

| | Historical Histology | Number of tubes | Percent tube lumen | Perimeter of tubes |
|---|---|---|---|---|
| Historical Histology | 1 | NA | NA | NA |
| Number of tubes | 0.742 | 1 | NA | NA |
| Percent tube lumen | 0.782 | 0.899 | 1 | NA |
| Perimeter | 0.789 | 0.972 | 0.975 | 1 |

To summarize, for experimental results derived from this embodiment, the perimeter of endoneurial tubes structural characteristic is a slightly better match to a historical qualitative analysis of graft structural quality. Two reasons are posited for this result. First, the perimeter structural characteristic does not change if the circular structure collapses during histological processing. Second, the perimeter of the outside of the lumen is a direct measurement of the interior surface of the endoneurial tube, which is coated with laminin, and presumably the quantity of accessible laminin is a key bioactive substance for fostering neurite regeneration in a graft.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method for assessing the quality of a nerve graft, the method comprising:
   obtaining an image identifying laminin-containing tissue in the nerve graft;
   creating a transformed image using a transformation function of an image processing application on the image;
   using an analysis function of the image processing application, analyzing the transformed image to identify one or more structures in accordance with one or more recognition criteria;

determining one or more structural characteristics of the nerve graft derived from a measurement of the one or more structures; and assessing the quality of the nerve graft based on the determined one or more structural characteristics, wherein the one or more recognition criteria comprises a size range of the one or more structures and wherein the size range is within a range from about 4.84 microns in diameter to about 16 microns in diameter.

2. The method of claim 1, wherein, before creating the transformed image, the method further comprises selecting one or more of an area of interest and a sampling window to delineate a selected image area, wherein the analyzing of the transformed image is performed only on the selected image area.

3. The method of claim 2, wherein the area of interest comprises a nerve fascicle.

4. The method of claim 1, wherein the one or more structures comprise an endoneurial tube.

5. The method of claim 1, wherein creating the transformed image comprises applying thresholding to the image.

6. The method of claim 5, wherein applying the thresholding comprises applying one or more of a threshold method, a threshold color, a color space, and a dark background.

7. The method of claim 1, wherein the one or more recognition criteria comprise a circularity range of the one or more structures.

8. The method of claim 7, wherein the circularity range is from about 0.5 to about 1.0.

9. The method of claim 1, wherein the one or more structural characteristics comprise the number of endoneurial tubes per area.

10. The method of claim 1, wherein the one or more structural characteristics comprise the percent of endoneurial tube lumen per area.

11. The method of claim 1, wherein the one or more structural characteristics comprise the total perimeter of endoneurial tube lumens per area.

12. The method of claim 1, further comprising:
comparing the one or more structural characteristics to a qualitative assessment score.

13. The method of claim 1, further comprising:
comparing the one or more structural characteristics to one or more reference ranges indicating an acceptable structural characteristic of the nerve graft.

14. The method of claim 1, further comprising:
comparing the one or more structural characteristics to a bioassay result of the nerve graft.

15. A method for assessing the structural quality of a nerve graft, the method comprising:
obtaining an image of tissue, the image depicting a cross-section of the nerve graft, wherein the cross-section is treated with a stain that indicates the presence of laminin;
selecting, using an image processing application, one or more nerve fascicles on the image;
using the image processing application, creating a thresholded image, wherein the thresholded image distinguishes one or more visual aspects of the image;
using a particle analysis feature of the image processing application on the thresholded image, identifying one or more endoneurial tubes contained within the boundary of the one or more nerve fascicles, wherein the particle analysis feature identifies the one or more endoneurial tubes in accordance with one or more recognition criteria;
determining one or more structural characteristics of the nerve graft derived from a measurement of the one or more endoneurial tubes; and assessing the structural quality of the nerve graft based on the determined one or more structural characteristics.

16. The method of claim 15, wherein the one or more recognition criteria comprise a size range of the one or more endoneurial tubes, wherein the size range is from about 4.84 microns in diameter to about 16 microns in diameter.

17. The method of claim 15, wherein the one or more recognition criteria comprise a circularity range of the one or more endoneurial tubes, wherein the circularity range is from about 0.5 to about 1.0.

18. The method of claim 15, wherein the one or more structural characteristics is one or more of: the number of endoneurial tubes per area, the percent of endoneurial tube lumens per area, and the total perimeter of endoneurial tube lumens per area.

19. The method of claim 15, further comprising:
comparing the one or more structural characteristics to one or more of:
a qualitative assessment score;
one or more reference ranges indicating an acceptable structural characteristic of the nerve graft; and
a bioassay result of the nerve graft.

20. The method of claim 15, wherein the stain is an immunoperoxidase stain.

21. A method for assessing the quality of a nerve graft, the method comprising:
obtaining an image identifying laminin-containing tissue in the nerve graft;
creating a transformed image using a transformation function of an image processing application on the image;
using an analysis function of the image processing application, analyzing the transformed image to identify one or more structures in accordance with one or more recognition criteria;
determining one or more structural characteristics of the nerve graft derived from a measurement of the one or more structures; and
assessing the quality of the nerve graft based on the determined one or more structural characteristics, and
wherein the one or more recognition criteria comprise a circularity range of the one or more structures, and wherein the circularity range is within the range from about 0.5 to about 1.0.

22. A method for assessing the quality of a nerve graft, the method comprising:
obtaining an image identifying laminin-containing tissue in the nerve graft;
creating a transformed image using a transformation function of an image processing application on the image;
using an analysis function of the image processing application, analyzing the transformed image to identify one or more structures in accordance with one or more recognition criteria;
determining one or more structural characteristics of the nerve graft derived from a measurement of the one or more structures; and
assessing the quality of the nerve graft based on the determined one or more structural characteristics, and
wherein the one or more structural characteristics comprise the total perimeter of endoneurial tube lumens per area.

* * * * *